(12) United States Patent
Liu et al.

(10) Patent No.: US 6,453,722 B1
(45) Date of Patent: Sep. 24, 2002

(54) INTEGRATED TEST SYSTEM FOR A DISC DRIVE PIVOT BEARING AND ACTUATOR

(75) Inventors: Xiong Liu, Singapore (SG); Joseph Cheng-Tsu Liu, Singapore (SG); Kevin Arthur Gomez, Singapore (SG); Choonkiat Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/330,938

(22) Filed: Jun. 11, 1999

Related U.S. Application Data

(60) Provisional application No. 60/089,006, filed on Jun. 11, 1998.

(51) Int. Cl.$^7$ .............................................. G11B 21/02
(52) U.S. Cl. ................................................................ 73/9
(58) Field of Search ...................................... 73/9, 855.9

(56) References Cited

U.S. PATENT DOCUMENTS

| | | |
|---|---|---|
| 5,514,953 A | 5/1996 | Schultz et al. |
| 5,661,615 A | 8/1997 | Waugh et al. |
| 5,742,446 A | 4/1998 | Tian et al. |
| 5,835,302 A | 11/1998 | Funches et al. |
| 5,856,624 A | 1/1999 | Elsing |
| 6,026,926 A * | 2/2000 | Noro et al. |

OTHER PUBLICATIONS

Eddy, K. et al., "Bias in Disk Drive Rotary Actuators: Characterization, Prediction, and Compensation," *IEEE Transactions on Magnetics*, vol. 33, No. 3, pp. 2424–2436 (May 1997).
Lovell, M. R. et al., "Evaluation of Ultra–Low–Speed Jitter in Rolling Balls," *Journal of Tribology*, vol. 114, pp. 589–594 (Jul. 1992).
Williams, D. et al., "Why rotary actuators behave the way they do," *Data Storage*, 7 pages (Nov./Dec. 1995).
M15 Universal Torque Tester, Manual, 16 pages (updated Jan. 4, 1997).

\* cited by examiner

*Primary Examiner*—Robert Raevis
(74) *Attorney, Agent, or Firm*—Merchant & Gould P.C.

(57) ABSTRACT

Disclosed is a method and apparatus for determining the dynamic characteristics of a desired component of an actuator assembly. Further, said method and apparatus are capable of determining the dynamic characteristics independent of any drive servo electronics. The system and method can also be used to determine other operating parameters such as rotational inertia. This information is useful for design verification, quality assurance and failure analysis.

19 Claims, 18 Drawing Sheets

INTEGRATED TEST SYSTEM FOR A DISC DRIVE PIVOT BEARING AND ACTUATOR

RELATED APPLICATIONS

This application claims the benefit of provisional application Serial No. 60/089,006, filed Jun. 11, 1998 entitled "Integrated Test System Of Pivot Bearing And Actuator".

FIELD OF THE INVENTION

The invention relates to disc drives. More specifically, the invention relates to a method and apparatus for testing the static and dynamic characteristics of rotatable devices such as the pivot bearing assemblies which are used to support actuator arms. More specifically, the invention relates to testing the dynamic characteristics of desired portions of an actuator arm and pivot bearing assembly independently of the drive electronics of the disc drive.

BACKGROUND OF THE INVENTION

Disc drives are used in workstations, laptops and personal computers to store large amounts of information in a readily accessible form. Typically, a disc drive includes a magnetic disc which is rotated at a constant high speed by a spindle motor. The disc surfaces are divided into a series of concentric data tracks. Each data track can store information as magnetic transitions on the disc surface.

A disc drive also includes a set of magnetic transducers that are used to either sense existing magnetic transitions during a read operation or to create new magnetic transitions during a write operation. Typically, each magnetic transducer is mounted in a head. Each head is mounted to a rotary actuator arm via a flexible element which can accommodate movement of the head during operation. The actuator arm serves to selectively position the head over a particular data track to either read data from the disc or to write data to the disc.

Typically, the actuator arm is driven by a voice coil motor. The magnetic transducers, mounted in heads, are present at the ends of the arms which extend radially outward from a substantially cylindrical actuator body. This actuator body is moveably supported by a ball bearing assembly known as a pivot bearing or pivot bearing assembly. The actuator body is parallel with the axis of rotation of the discs. The magnetic transducers, therefore, move in a plane parallel to the disc surface.

The voice coil motor typically includes a coil which is mounted in the actuator arm at the end opposite the heads. This coil is permanently immersed in a magnetic field resulting from an array of permanent magnets which are mounted to the disc drive housing. Application of DC current to the coil creates an electromagnetic field which interacts with the permanent magnetic field, causing the coil to move relative to the permanent magnets. The voice coil motor essentially converts electric current into mechanical torque. As the coil moves, the actuator arm also moves, causing the heads to move radially across the disc surface.

Control of this movement is accomplished via a closed loop servo system. In this control system, position (or servo) information is prerecorded on at least one surface of one of the discs. The servo system can be dedicated, which means that an entire disc surface is prerecorded with servo information. In this case, a particular head is dedicated to reading only servo information. Alternatively, the servo system can be embedded. This means that the servo information is interweaved with the user data, and is intermittently read by the same heads which are used to read and write information.

Servo system designers need to have an accurate picture of how the actuator moves. The mechanical static and dynamic characteristics of an actuator are directly related to servo performance. It is thus necessary to obtain this information for proper servo design. As the servo system attempts to position the actuator, the dynamic characteristics of the ball bearing can have an adverse effect on the accuracy of this positioning. Therefore, it is important to be able to determine the dynamic characteristics of the pivot bearing assembly and provide this information to the servo designers. This is especially important during track following mode.

Servo systems typically include two controllers, a seek controller and a tracking controller. The seek controller manages large head movements for approximate placement of the actuator arm. Then, the tracking controller is responsible for the small displacements necessary to follow a particular track. While under the control of the tracking controller, the pivot bearing which supports the actuator arm undergoes movements as small as less than about 0.003 degrees ball rotation and less than about 50 nanometers ball displacement. These movements are small enough to be adversely effected by the dynamics of ball movement.

It is thus desirable to be able to characterize both the static and dynamic characteristics of the pivot bearing in order to allow a servo designer to properly design the servo system.

Hysteresis is another problem for servo system designers. Hysteresis refers to the friction torque inherent in any rolling ball bearing device. A ball bearing will move in response to an input force. However, implementation of the same force in the opposite direction will fail to return the ball bearing to its exact starting position because of the hysteresis.

Until now, one test available for characterizing a pivot bearing assembly has been to measure its static torque. This has typically been done via a Bearing Static Torque Tester, such as the one manufactured by Measurement Research, Inc of San Fernando, Calif. This test is often performed by pivot bearing assembly manufacturers. One result of this test is to describe the friction of the ball bearings. Unfortunately, this information can not be accurately correlated to actual dynamic operating conditions of the actuator when under the control of a drive servo system.

Previous attempts at evaluating the dynamic characteristics of an actuator arm and pivot bearing assembly have been less than successful. These attempts have included generating and analyzing mechanical Bode plots. However, these tests were performed using the disc drive circuitry, i.e., the position error signal (PES) from the actuator assembly. This requires that for the disc drive, it had to be physically modified to gain access to this signal to allow testing. Specifically, the PES signal is tapped from the pre-amp chip present in the disc drive circuitry. Because the PES signal is used for testing, not only were the drive level servo electronics not eliminated, but the entire actuator arm, from head through pivot bearing, was being tested since there was no capacity to test particular components of the actuator assembly independently of either the drive electronics or the other components of the assembly.

Bode plots have been generated using laser Doppler vibrometers, however, information regarding the velocity of the actuator movement was not obtainable. In addition, tests using a laser Doppler vibrometer were conducted on the hard disc drive using the drive electronics which required physical modification of the drive itself as previously discussed.

Therefore, a need exists for a test system and apparatus that permits accurate characterization of the dynamic characteristics of components of an actuator assembly, such as pivot bearing assembly. A need exists for a test system and apparatus that allows particular components to be tested in isolation of other components of an actuator assembly such as a pivot bearing assembly. A need exists for a test system and apparatus which can characterize components of an actuator assembly such as a pivot bearing and actuator arm without requiring physical modification of the device being tested. Furthermore, a need exists for a testing apparatus and system that supports actuator assemblies with different operating characteristics to be tested.

SUMMARY OF THE INVENTION

Accordingly, the invention is found in an integrated test system which provides for determination of the dynamic characteristics of an actuator assembly. In a preferred embodiment of the invention, the integrated test system determines dynamic characteristics of an actuator assembly independently of the servo control electronics. In a preferred embodiment of the integrated test system of the present invention a desired component can be isolated and tested. In a preferred embodiment of the integrated test system of the present invention, no physical modifications to the device being tested are required.

Specifically, a preferred embodiment of the integrated test system of the present invention is found in a method of dynamically characterizing a desired component on an actuator assembly. The method includes mounting the actuator assembly on a test platform which has a motion sensor, a coil driver coupled to the actuator assembly, a microcontroller coupled to the motion sensor, the coil driver, a computer and a signal analyzer coupled to the coil driver, the motion sensor and the computer. The microcontroller receives displacement and velocity feedback signals from the motion sensor and is programmed to perform PID control based on the feedback signals. The method also includes inputting a command from the computer to conduct a position test on the desired component of the actuator assembly. The position test includes supplying a signal to the coil driver to cause movement of the desired component on the actuator assembly, aiming the motion sensor at the desired component on the actuator assembly, sensing displacement feedback from the desired component with the motion sensor, and collecting a current sense signal from the coil driver and displacement feedback from the motion sensor with the signal analyzer.

Another preferred embodiment of the integrated test system of the present invention is found in a method of calculating an inertia of a component. The method includes mounting the component on an actuator assembly located a test platform which has a motion sensor, a coil driver coupled to the actuator assembly, a microcontroller coupled to the motion sensor, the coil driver, a computer and a signal analyzer coupled to the coil driver, the motion sensor and the computer, wherein the microcontroller receives displacement and velocity feedback signals from the motion sensor and is programmed to perform PID control based on the feedback signals. The method further includes the step of inputting a command from the computer to conduct a position test on the desired component of the actuator assembly wherein the position test includes supplying a signal to the coil driver to cause movement of the actuator assembly, aiming the motion sensor at the component located on the actuator assembly, sensing displacement feedback from the component with the motion sensor, collecting a current sense signal from the coil driver and displacement feedback signals from the motion sensor, and calculating the moment of inertia of the component.

Another preferred embodiment of the present invention is found in an integrated test system for dynamically characterizing a desired component of an actuator assembly. The integrated test system includes a test platform suitable for mounting the actuator assembly to be tested, a motion sensor aimed at the desired component, a coil driver mounted on the test platform wherein the coil driver is operatively coupled to the actuator assembly to instruct the actuator assembly to move, a microcontroller mounted on the test platform, wherein the microcontroller is operatively coupled to the coil driver to exert PID control over the actuator assembly, and a signal analyzer mounted on the test platform, wherein the signal analyzer is operatively coupled to the motion sensor and the coil driver and the signal analyzer collects displacement and velocity feedback signals.

Another preferred embodiment of the present invention is found in an integrated test system for dynamically characterizing a desired component of an actuator assembly. The test system includes a test platform for mounting the actuator assembly, a motion sensor aimed at the desired component on the actuator assembly, means for operatively instructing the actuator assembly to move, for exerting PID control over the actuator assembly and collect put signal, and collect displacement and velocity feedback signals from the motion sensor.

These and other features as well as advantages which characterize the present invention will be apparent from a reading of the following detailed description and a review of the associated drawings.

DETAILED DESCRIPTION OF THE PRESENTLY PREFERRED EMBODIMENTS

Figure 1:
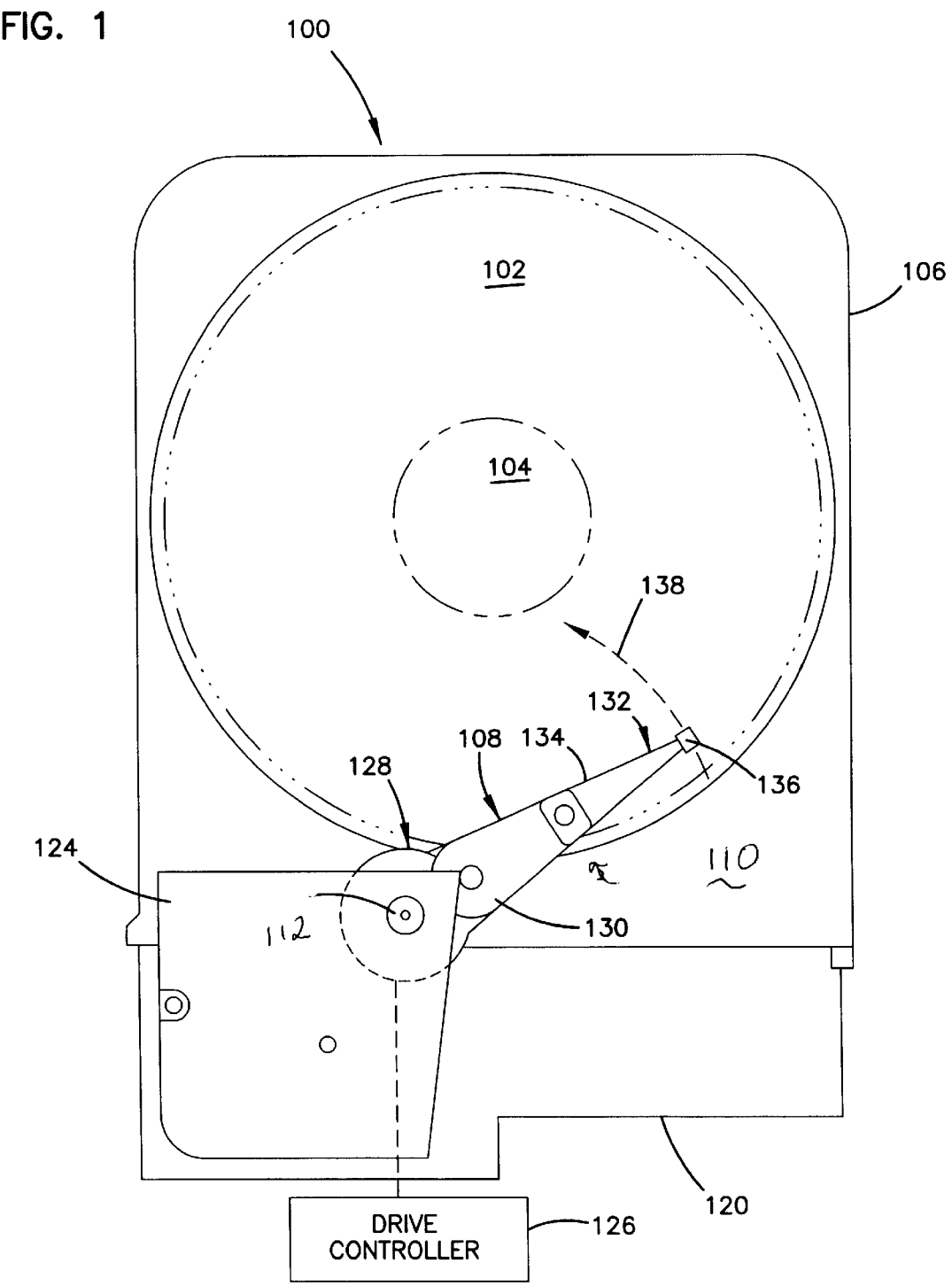
FIG. 1 is a perspective view of a typical hard disc drive.

Referring now to the drawings, in which similar reference numbers are used to denote similar structures or items, FIG. 1 shows a typical disc drive 100. Disc drive 100 includes a magnetic disc 102 mounted for rotational movement about an axis defined by spindle 104 within housing 106. Disc drive 100 also includes a stacked actuator system 108 mounted to a base plate 110 of the housing 106 and pivotally movable relative to disc 102 about axis 112. A cover not shown covers a portion of stacked actuator system 108. Drive controller 126 is coupled to stacked actuator system 108. In a preferred embodiment, drive controller 126 is either mountable within disc drive 100 or is located outside of disc drive 100 with suitable connection to stacked actuator system 108.

In a preferred embodiment, stacked actuator system 108 includes an actuator arm assembly 130, a rigid support member 128, and a head gimbal assembly 134. Head gimbal assembly 134 includes a load beam or flexure arm 132 coupled to rigid member 128, and a slider 136 coupled by a gimbal (not shown) to load beam 132. Slider 136 supports a transducer for reading information from disc 102 and encoding information on disc 102.

During operation, drive controller 126 receives position information indicating a portion of disc 102 to be accessed. Drive controller 126 receives the position information from the operator, from a host computer or from another suitable controller. Based on the position information, drive controller 126 provides a position signal to stacked actuator system 108. The position signal causes stacked actuator system 108 to pivot or rotate about axis 112. This, in turn, causes slider 136 and the transducers mounted on slider to move radially over the surface of the disc 102 in a generally arcuate path as indicated by arrow 138. Once the transducer is properly positioned, drive controller 126 then executes a desired read or write operation.

As will be described in detail below, in a preferred embodiment, the integrated test system according to a preferred embodiment of the invention is used to characterize the dynamic performance of an actuator assembly. In a preferred embodiment, the integrated test system allows the characterization of the dynamic performance of specific components of an actuator assembly without requiring physical modification to the component.

Figure 2:
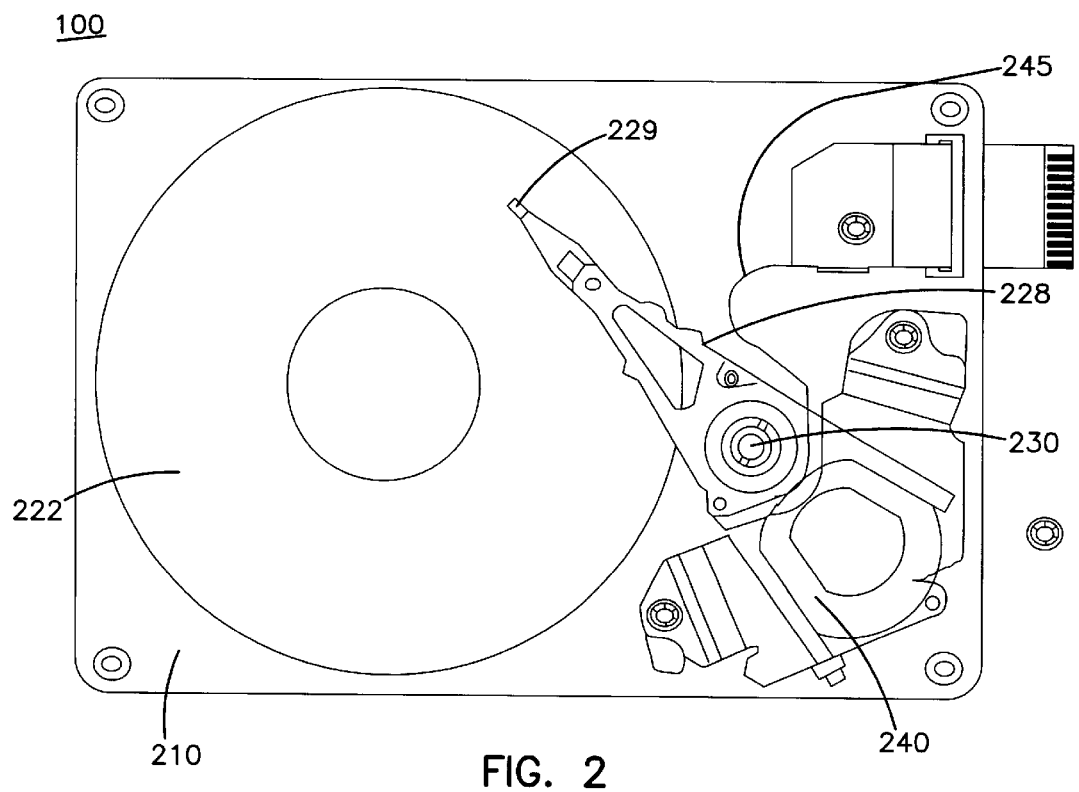
FIG. 2 is a top plan view of a portion of a hard disc drive, illustrating the geometric relationship between the actuator and pivot bearing assembly.

FIG. 2 is a top plan view of a portion of a hard disc drive 100, illustrating the geometric relationship between an actuator arm 228 and a pivot bearing pivot bearing assembly assembly 230. The actuator arm 228 is moved via voice coil motor 240. Flex circuit 245 provides the necessary signal connections between the actuator arm 228, head 229 and voice coil motor 240.

Figure 3:
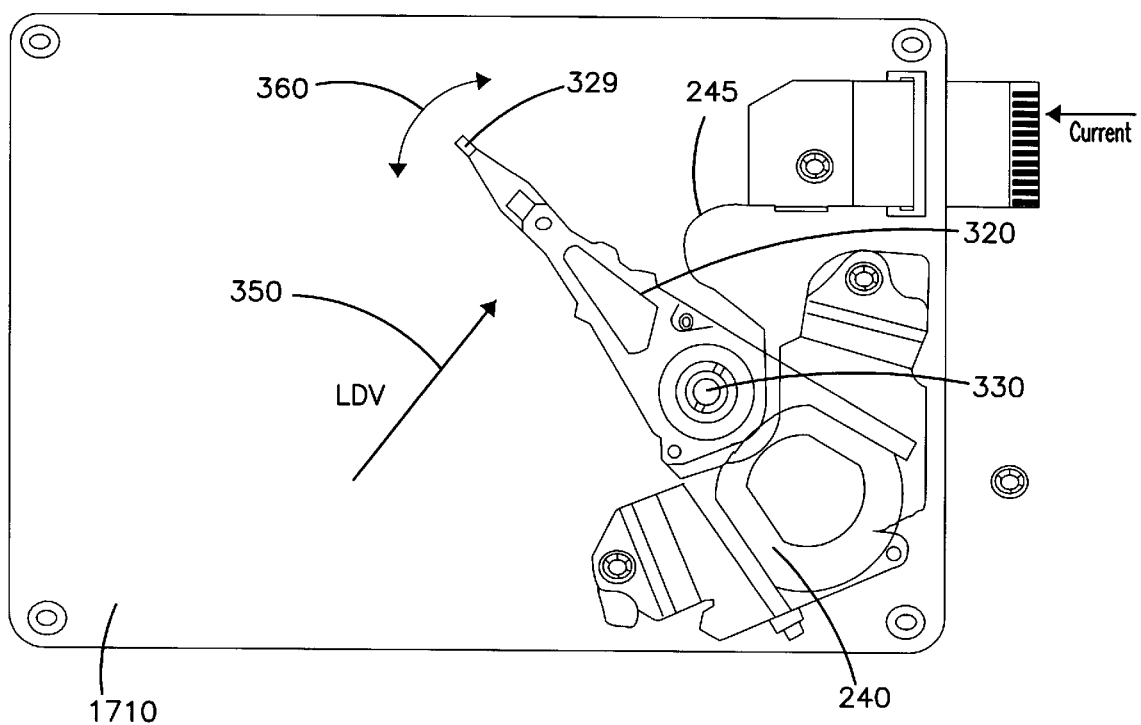
FIG. 3 is a top plan view of the test platform according to a preferred embodiment of the present invention.

FIG. 3 is a top plan view of a test platform 1710 according to a preferred embodiment of the present invention. The actuator assembly 320 is mounted on the test platform 1710 for testing. Current is supplied to the voice control motor 240. The actuator assembly 320 can be moved radially as shown by arrow 360 as it would normally when installed in a disc drive. A motion sensor 350 is located near the test platform 1710 but is separate therefrom. The motion sensor 350 can be positioned to detect motion in various components of the actuator assembly 320 simply by aiming the motion sensor 350 at the particular component as will be described hereinafter. In a preferred embodiment, the motion sensor 350 is a laser Doppler vibrometer. In FIG. 3, the motion sensor 350 is positioned in such a way as to capture the movement of the entire actuator assembly 320. Different components of the actuator assembly 320 can be tested simply by pointing motion sensor 350 at the desired component. For example, motion sensor 350 can be aimed directly at the head 329 located at one end of the actuator arm, or at the suspension arm (not shown) to determine the mechanical resonances of those components. Alternatively, the voice coil motor 240 itself could be tested.

Figure 4:
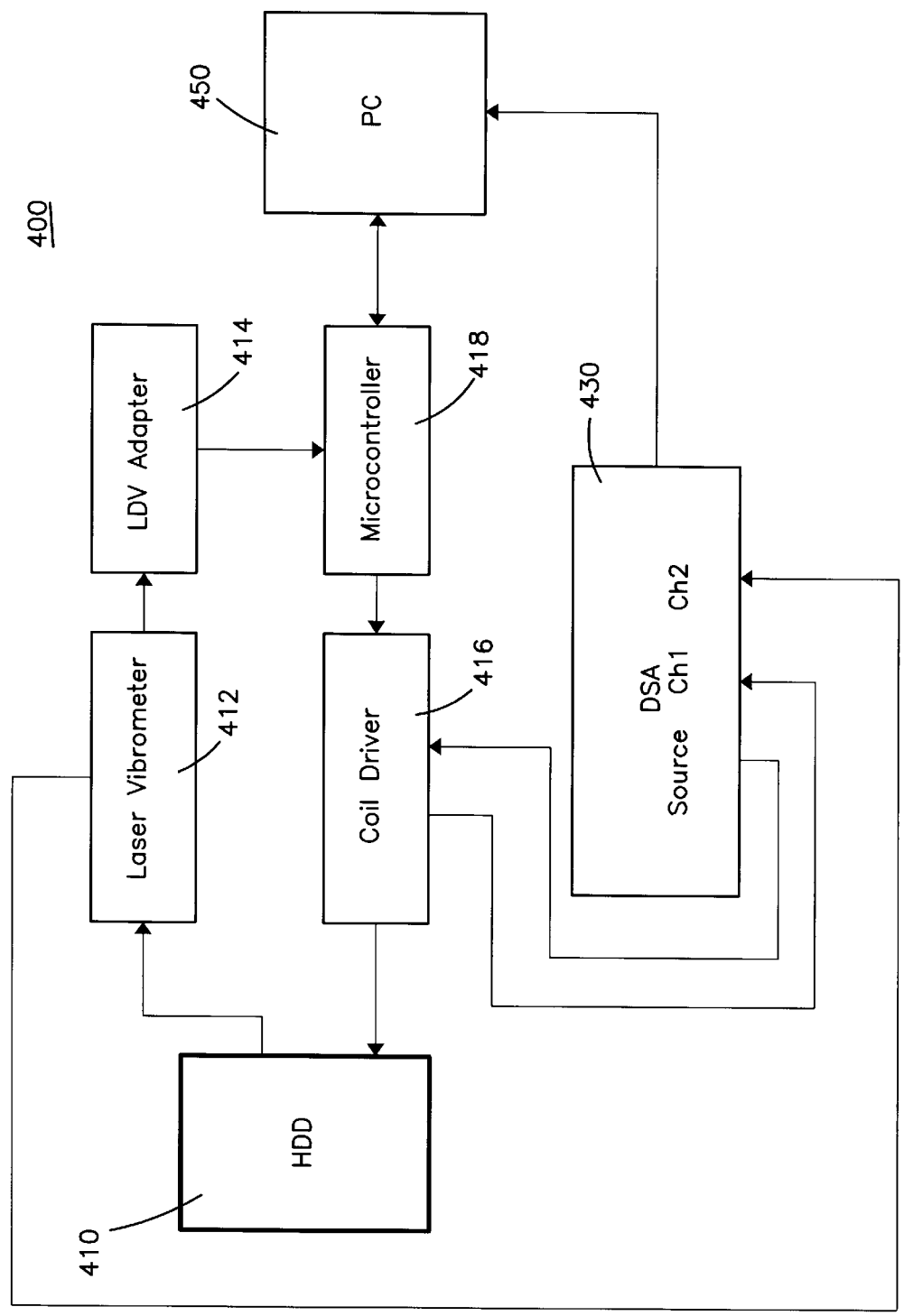
FIG. 4 is a block diagram of a pivot bearing assembly test system according to a preferred embodiment of the invention.

FIG. 4 is a block diagram of the test apparatus and system 400 according to a preferred embodiment of the invention. The test system 400 includes a test platform 1710, a motion sensor 412, an adapter 414, a microcontroller 418, a coil driver 416, a signal analyzer 430 and a computer 450, as will be described in detail hereinafter. While discrete components are illustrated, the test system 400 of the present invention can be configured in such a way as to combine some or all of the components shown, such as the responsibilities of the microcontroller 418 and the signal analyzer 430 with the computer 450, for example.

As previously described, motion sensor 412 is preferably a laser Doppler vibrometer. Motion sensor 412 can measure both the velocity and displacement of the actuator assembly (or other component being tested) as a function of time. The output of the motion sensor 412 is analog and is fed to the adapter 414 which scales the signal to a proper level so it can be tied to the A/D portion of the microcontroller 418. Preferably, the microcontroller 418 exerts proportional-integral-derivative (PID) control on the coil driver 416. The coil driver 416 is a power supply circuit which drives the voice coil motor 240 (part of HDD 410) to control the actuator assembly 320 mounted on the test platform 1710. Computer 450 is coupled to the microcontroller 418 and signal analyzer 430 and implements the testing logic according to a preferred embodiment of the present invention.

The motion sensor 412 has an output coupled to the signal analyzer 430 and the microcontroller 418 through adapter 414 which provides either displacement or velocity signals to the analyzer depending of what kind of test is being run as will be described hereinafter. The coil driver 416 also has an output coupled to the signal analyzer 430 that provides a current sense signal to the analyzer 430. The signal analyzer 430 has a source output coupled to the coil driver 416 wherein in a preferred embodiment the signal analyzer 430 outputs a sweep sine signal to the coil driver 416.

Figure 5:
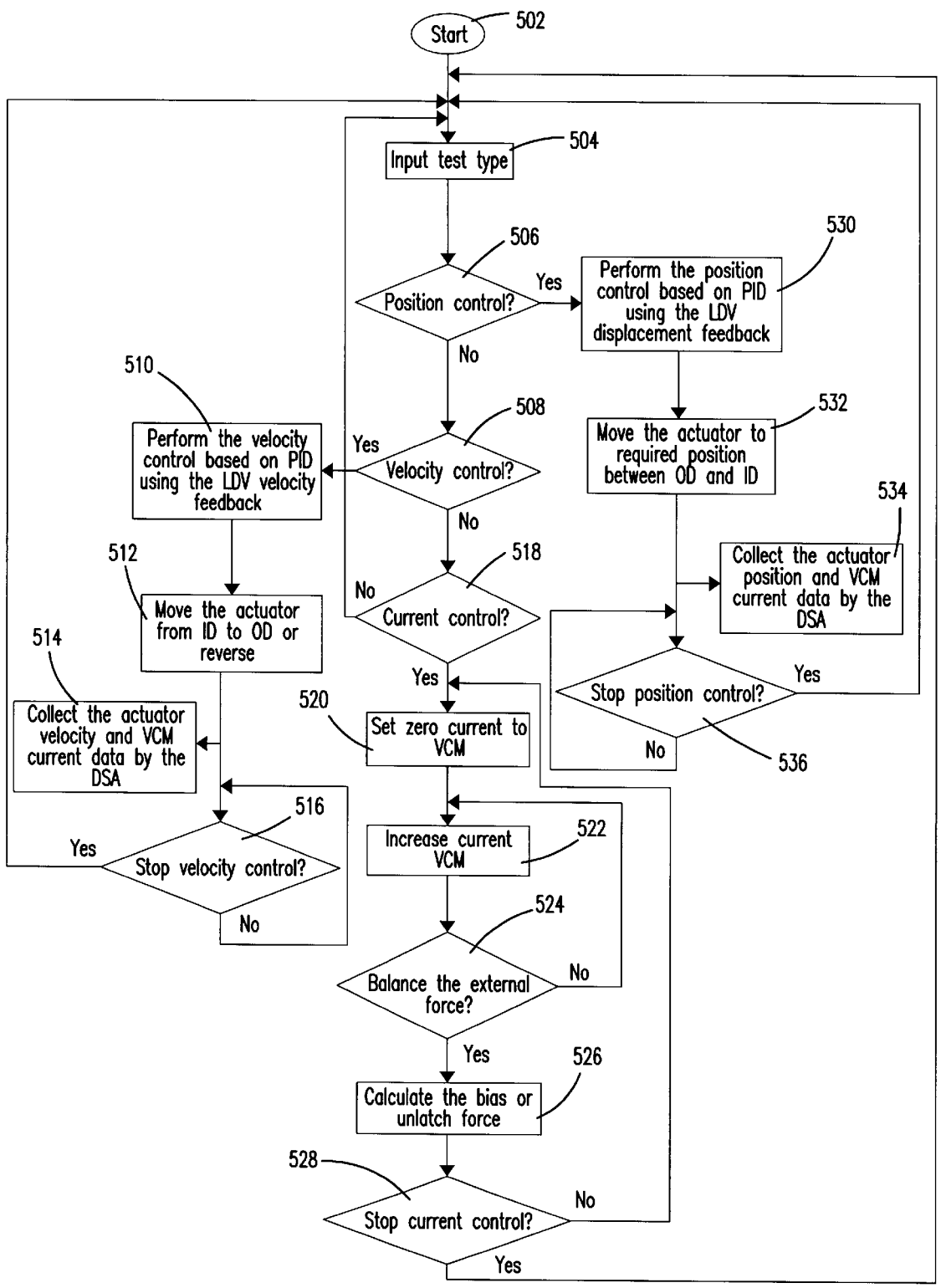
FIG. 5 is a flow chart showing the logic implemented by the personal computer software.
Figure 6:
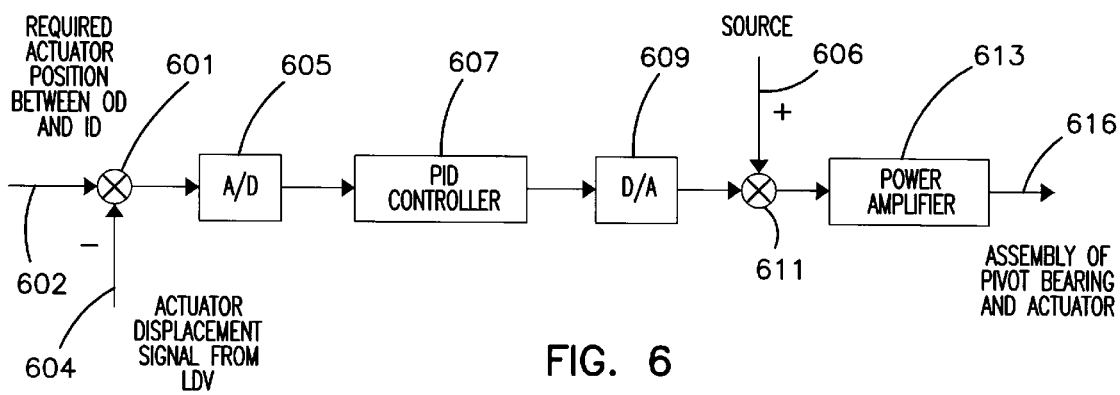
FIGS. 6–7 are block diagrams of an embodiment of the microcontroller and coil driver, in which position control and velocity control are implemented, respectively.
Figure 7:
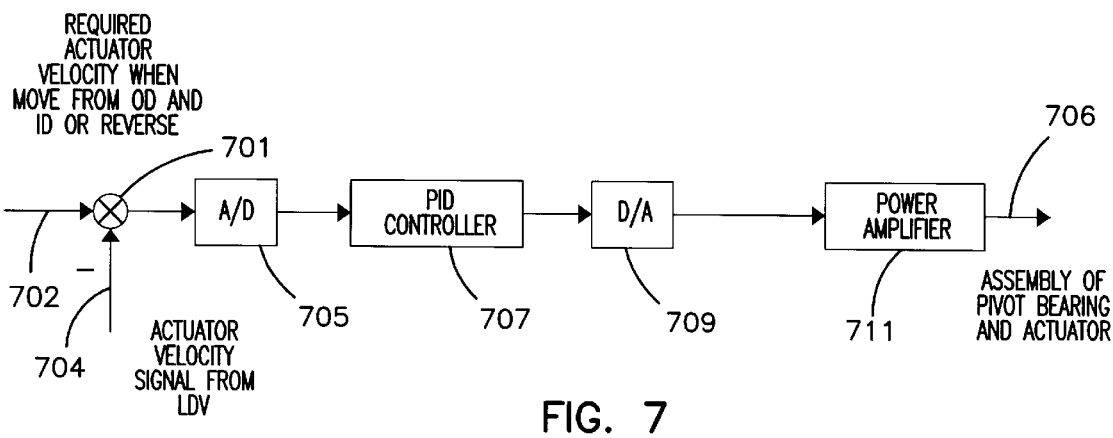
Figure 8:
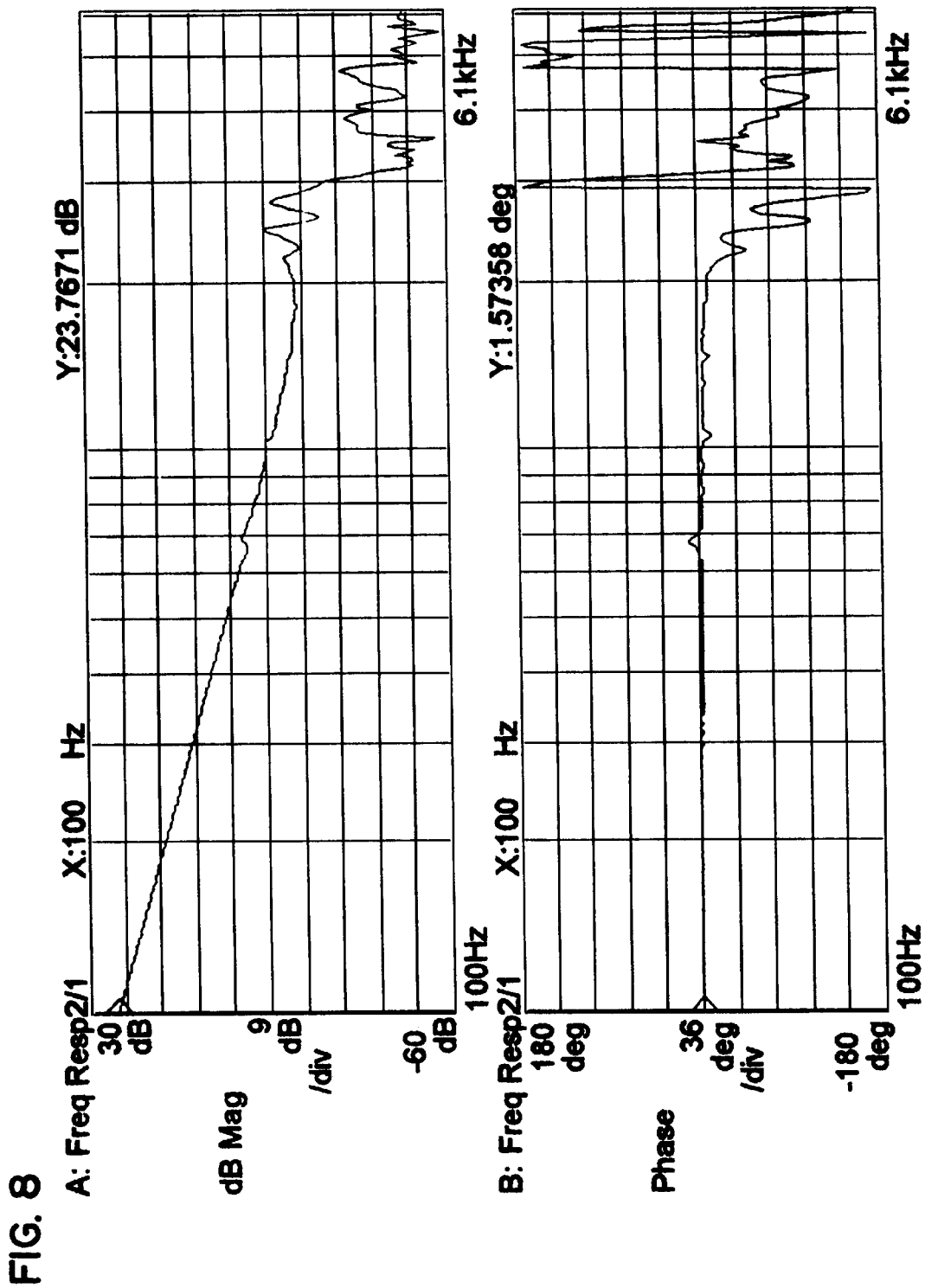
FIG. 8 is a pure mechanical Bode plot taken at the outer diameter.

The operation of the integrated test system according to a preferred embodiment of the invention will now be described with reference to FIGS. 5–7. FIG. 5 is a flowchart showing the preferred logic of the software executed by computer 450. FIGS. 6–7 are block diagrams of an embodiment of the microcontroller and coil driver in which position and velocity control are implemented, respectively.

With reference to FIG. 6, when position control test is implement, signal 602 is received from the computer 450 and represents a command to locate the actuator at a particular position. Signal 604 is received from the motion sensor 412 and represents the actuator displacement signal which is subtracted from signal 602 at junction 601. The output of junction 601 is an error signal which is converted to a digital signal at block 605. The digitized error signal is sent to PID controller 607 where PID control is performed. The output of the PID controller 607 is converted to an analog signal at block 609. The output of the PID controller is sent to coil driver 416 (see FIG. 4) and at junction 611, the output of the PID controller 607 is added to the source signal 611 received from the signal analyzer 430. The resultant signal is sent to power amplifier 613 (i.e., coil driver 411) and the output of amplifier 613 is sent to the actuator assembly 320 mounted on the test platform 1710.

With reference to FIG. 7, when a velocity control test is implemented, signal 702 is received from the computer 450 and represents a command to move the actuator assembly 320 at a desired velocity. Signal 704 is received from motion sensor 412 and represents the actual velocity at which the actuator assembly 320 is moving. The actual velocity is subtracted from signal 702 at junction 701. The output of junction 701 is an error signal that is fed to the microcontroller 418 which performs PID control as previously described. The output of the microcontroller 418 is fed to the coil driver 416 which includes power amplifier 711. The output of the amplifier is sent to the actuator assembly 320 mounted on the test platform 1710.

Now with reference to the flowchart shown in FIG. 5, the logic implemented by the computer 450 will now be described. Control begins at starting point 502. At step 504 the user is prompted to select a test type which can be either position, velocity or current control. The user makes the selection at computer 450. Control then passes to decision block 506 where it is determined if position control was selected. If position control was selected, control passes to step 530. Because the displacement feedback signal is used, the microcontroller 418 operates as shown in FIG. 6. Thus, the reference position of the actuator assembly 320 is initialized. Control is then passed to step 532. At step 532, a command is sent by computer 450 to move the actuator assembly 320 to a desired position which is somewhere between an outer and inner diameter. Control is then passed to step 534, where the displacement feedback and voice coil sense current are collected by the dynamic signal analyzer 430. Next, at step 536 it is determined whether to stop the position control test. If no such decision is made, control remains at decision step 536. Otherwise, control passes back to input step 504 where another test can be performed.

With the position control test implemented and the information collected by signal analyzer 430, various parameters of the component of the actuator assembly being tested can be analyzed. For example, a pure mechanical Bode plot can be generated. Because the drive circuitry is not used for testing, the Bode plot does not include servo effects as are present in the prior art technique. The signal analyzer 430 calculates the Bode plot using the outputs of the motion sensor 412 and the coil driver 416. In this particular test, the motion sensor 412 was aimed at the arm tip of the actuator assembly 320 with the arm tip located at the outer diameter. This plot shows the mechanical resonance and phase relationship of the arm tip at that location. Of course, Bode plots for other components of the actuator assembly 320 at other locations can also be generated. In addition, graphs of other parameters can be generated from the information obtained using the integrated test system 400 according to the present invention.

Figure 15:
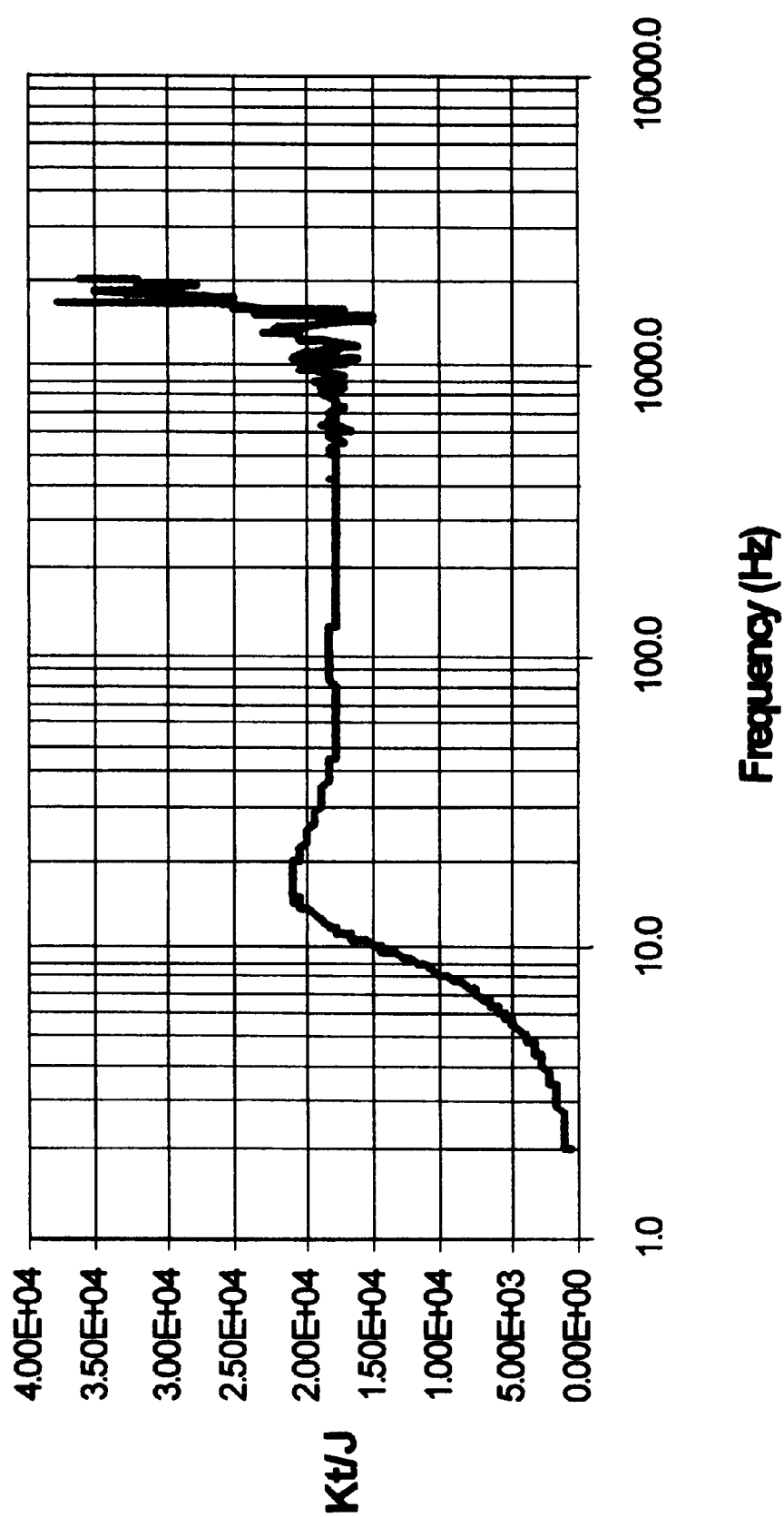
FIG. 15 is a plot of $K_t/J$ versus log frequency.
Figure 16A:
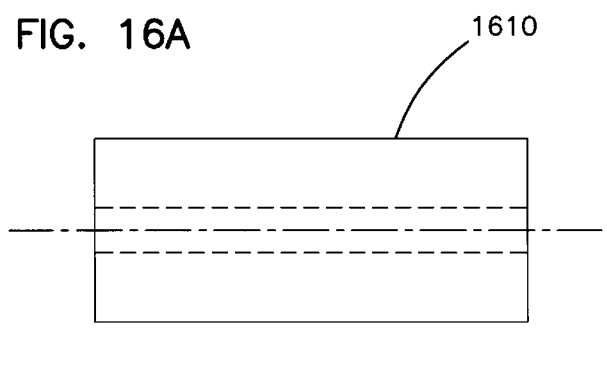
FIGS. 16A–D are schematic views of components with known polar moments of inertia.
Figure 16B:
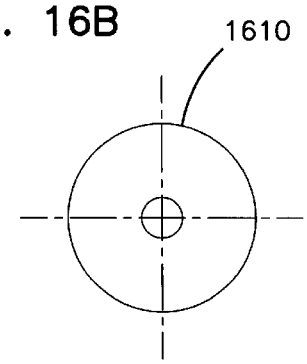
Figure 16C:
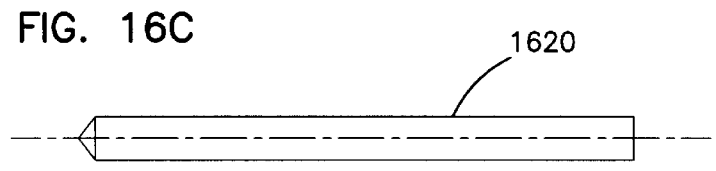
Figure 16D:
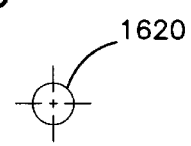

The motor torque, $K_t$ is a fundamental parameter in actuator design, and is often assumed to be constant from the outer to inner diameter of the disc. However, due to flux leakage and geometry constraints it is, in fact, not constant as the magnets used in the voice coil motor 240 are not uniform. A plot of $K_t/J$ in the frequency domain as shown in FIG. 15 can be calculated according to equation (1):

$$\frac{K_t}{J} = \omega^2 \frac{\Theta(\omega)}{I(\omega)} \quad (1)$$

Figure 14:
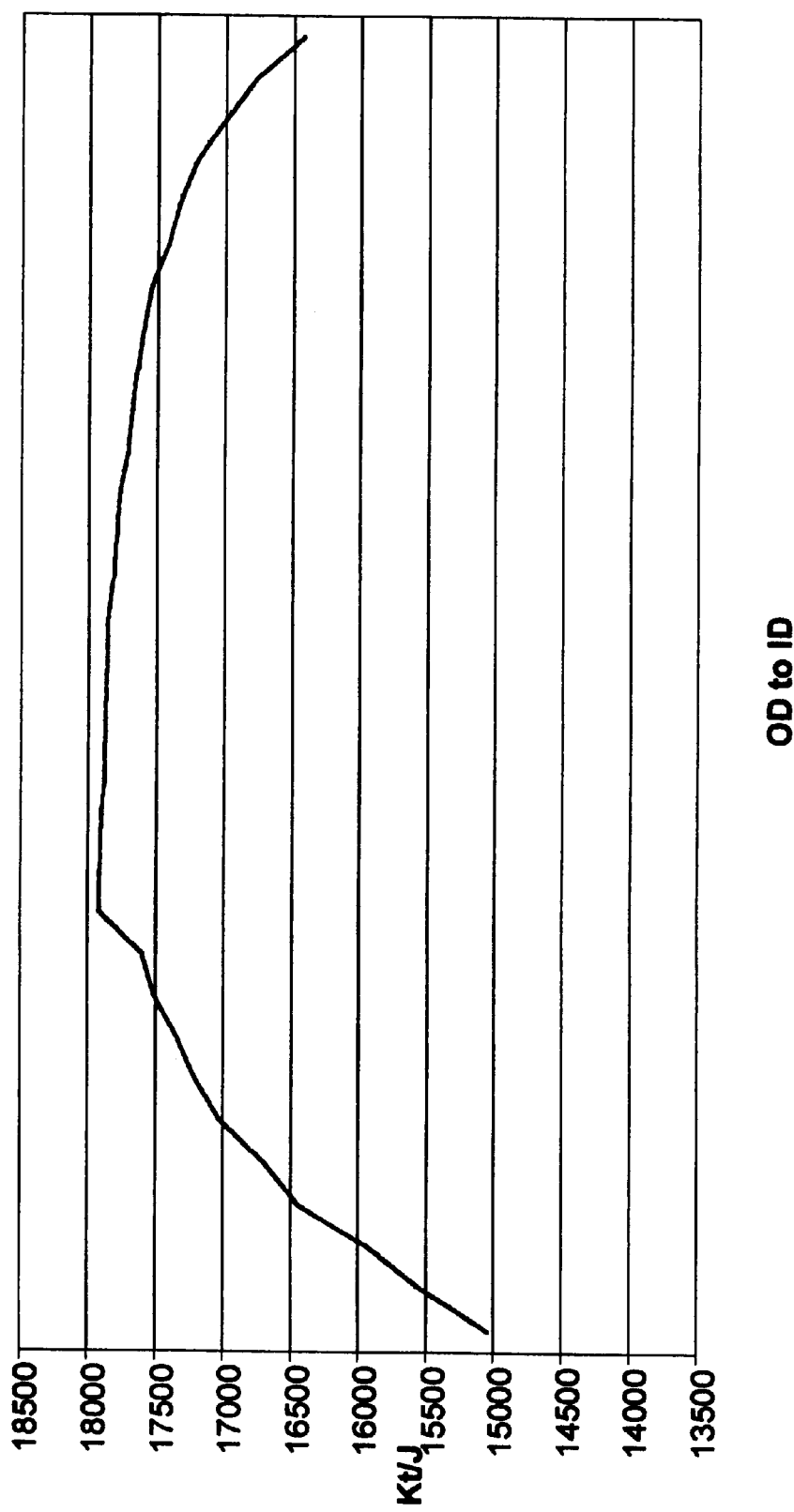
FIG. 14 is a plot profiling $K_t/J$, moving from the inner to the outer diameter.

In equation (1), $I(\omega)$ and $\Theta(\omega)$ are generated from Bode plots. A plot of $K_t/J$ versus position of the actuator assembly as shown in FIG. 14 can also be calculated. The plot was calculated at a frequency of 200 Hz.

$K_t$ and $J$ individually are also important parameters for actuator design. With proper calibration, these can be calculated from the $K_t/J$ plot. In order to perform a proper calibration, an accessory part with a known moment of inertia like that shown in FIGS. 16A–D is attached to the actuator assembly to determine $K_t$ and $J$ individually. $J$ is given by equation (2):

$$J = J_s \frac{k_2}{k_1 - k_2}, \quad (2)$$

in which:

$$k_1 = \frac{K_t}{J},$$

from a first run without the calibration part, and $$k_2 = \frac{K_t}{J + J_s},$$

from a second run with the calibration part.

Figure 17:
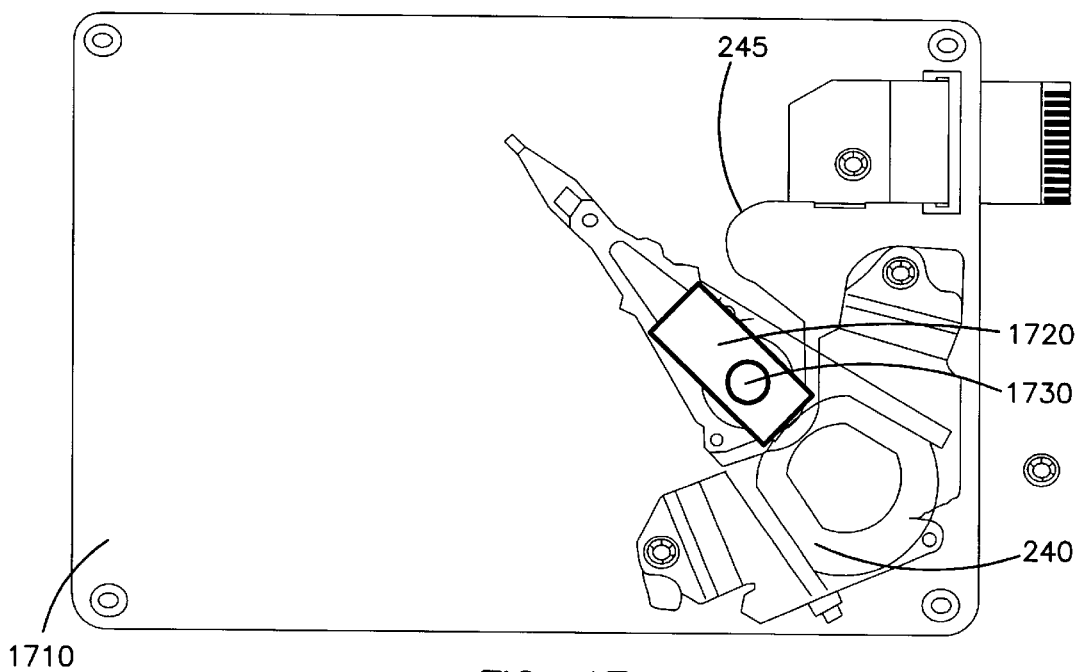
FIG. 17 is a top plan view of the test platform, illustrating the layout used for measuring the moment of inertia of the component.

After the moment of inertia of the actuator assembly is obtained, the method described above can be used to obtain the moment of inertia of an arbitrary part 1720 as shown in FIG. 17 where the arbitrary part is attached to the actuator assembly. This system can be used as an instrument to measure the moment of inertia of a part about a desired axis.

The test system described by a preferred embodiment of the present invention is also designed to calculate Bode plots at low frequencies starting as low as about 1 Hz. The damping ratio and spring force can be derived from these low frequency Bode plots. During track-follow mode, when the spring and damping forces cannot be ignored, the relevant transfer function can be expressed by equation (3) as follows:

$$\frac{\Theta(\omega)}{I(\omega)} = \frac{K_t}{-J\omega^2 + jc\omega + k}, \quad (3)$$

where:
$\omega$=excitation frequency in the rigid body portion,
$I(\omega)$=amplitude spectrum of current,
$\Theta(\omega)$=amplitude spectrum of angular displacement,
J=moment of inertia of the actuator assembly,
$J_s$=moment of inertia of the calibration part,
$K_t$=motor torque constant,
c=torsional damping constant of the pivot bearing assembly, and
k=torsional stiffness of the pivot bearing pivot bearing assembly.

The torsional stiffness of the pivot bearing assembly (k) can be derived by taking the limit of transfer function described above, where ω tends to 0:

$$k = K_t \frac{I(\omega)}{\Theta(\omega)}.$$

Likewise, c, the torsional damping constant of the pivot bearing assembly, can be calculated when ω equals the natural frequency $\omega_n$:

$$c = K_t \frac{I(\omega)}{\Theta(\omega)} \frac{1}{\omega_n}.$$

Figure 18:
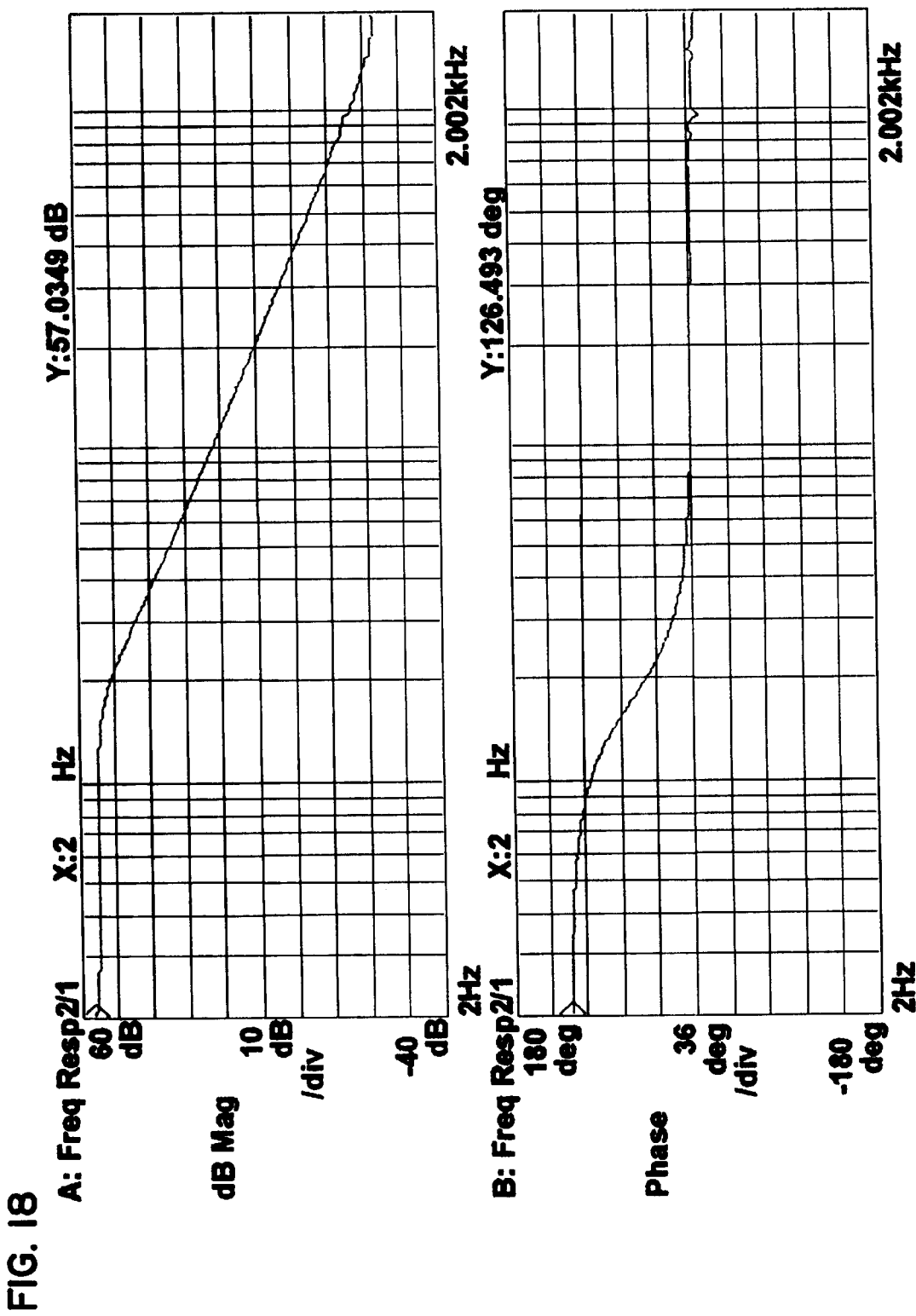
FIG. 18 is a low frequency Bode plot of a good pivot bearing assembly.
Figure 19:
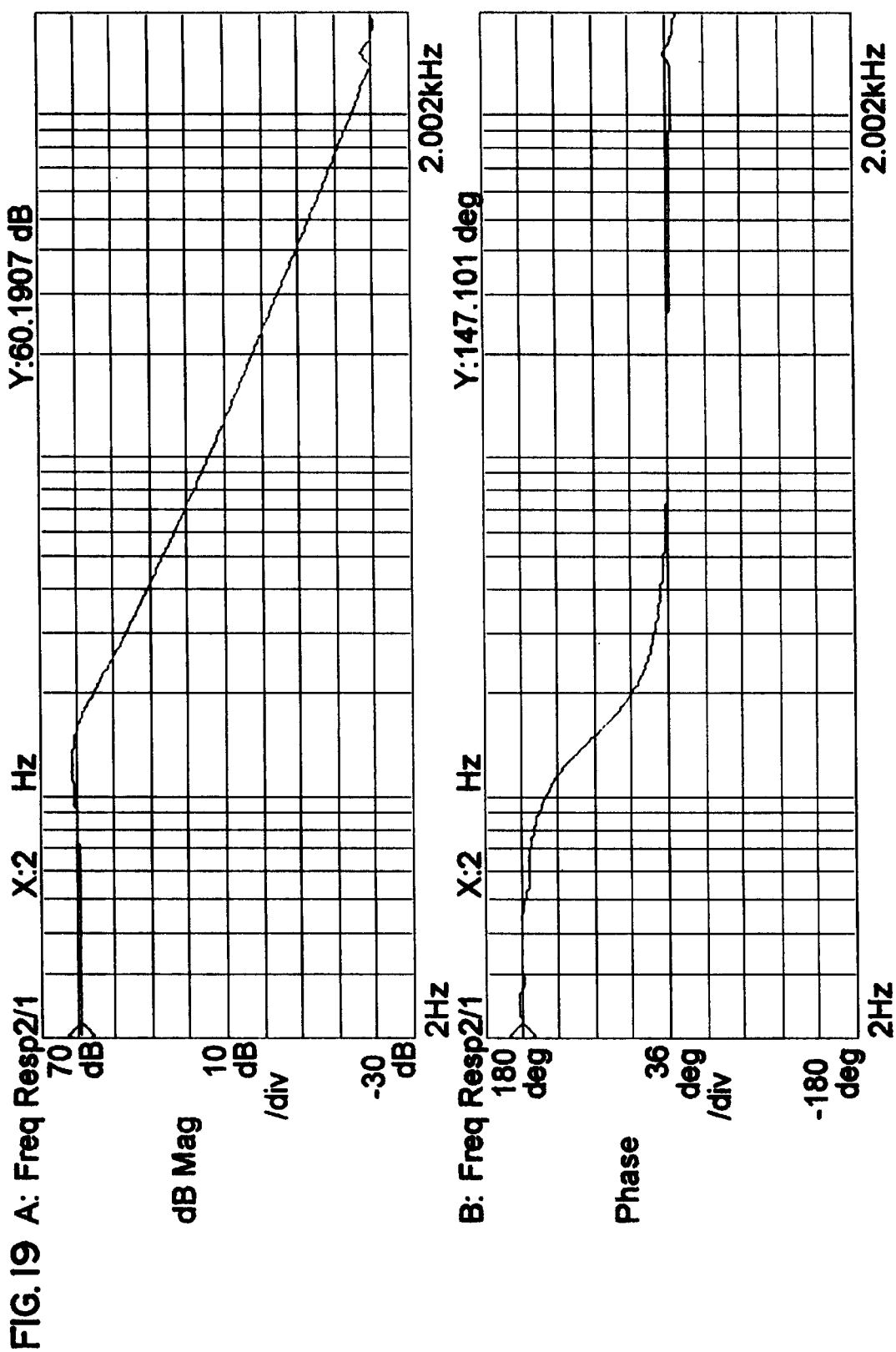
FIG. 19 is a low frequency Bode plot of a bad pivot bearing assembly.

The importance of low frequency Bode plots is described above. FIGS. 18–19 give low frequency Bode plots for a good pivot bearing assembly and a bad pivot bearing assembly, respectively. In comparison it is apparent that the bad pivot bearing assembly exhibited lighter damping, as evidenced by the slight increase in amplitude ratio at about 8 Hz in FIG. 19. Subsequently, the good pivot bearing assembly was determined to have a damping ratio of 0.67 and a spring force of 0.037 N·m/rad. The bad pivot bearing assembly was found to have a damping ratio of 0.39 and a spring force of 0.034 N·m/rad. Clearly, the good pivot bearing assembly exhibited improved damping.

During track following and short track seeks, actuator motion is of very small amplitude. During small amplitude movement, the hysteresis in the friction of the ball bearing becomes significant. Accordingly, the integrated test system of the preferred embodiment of the present invention is able to provide the free-rolling torque $T_s$, the energy dissipated per cycle at a given frequency, and the shape of hysteresis friction. The present invention is able to collect the data that is needed to later calculate the hysteresis friction behavior.

Figure 20:
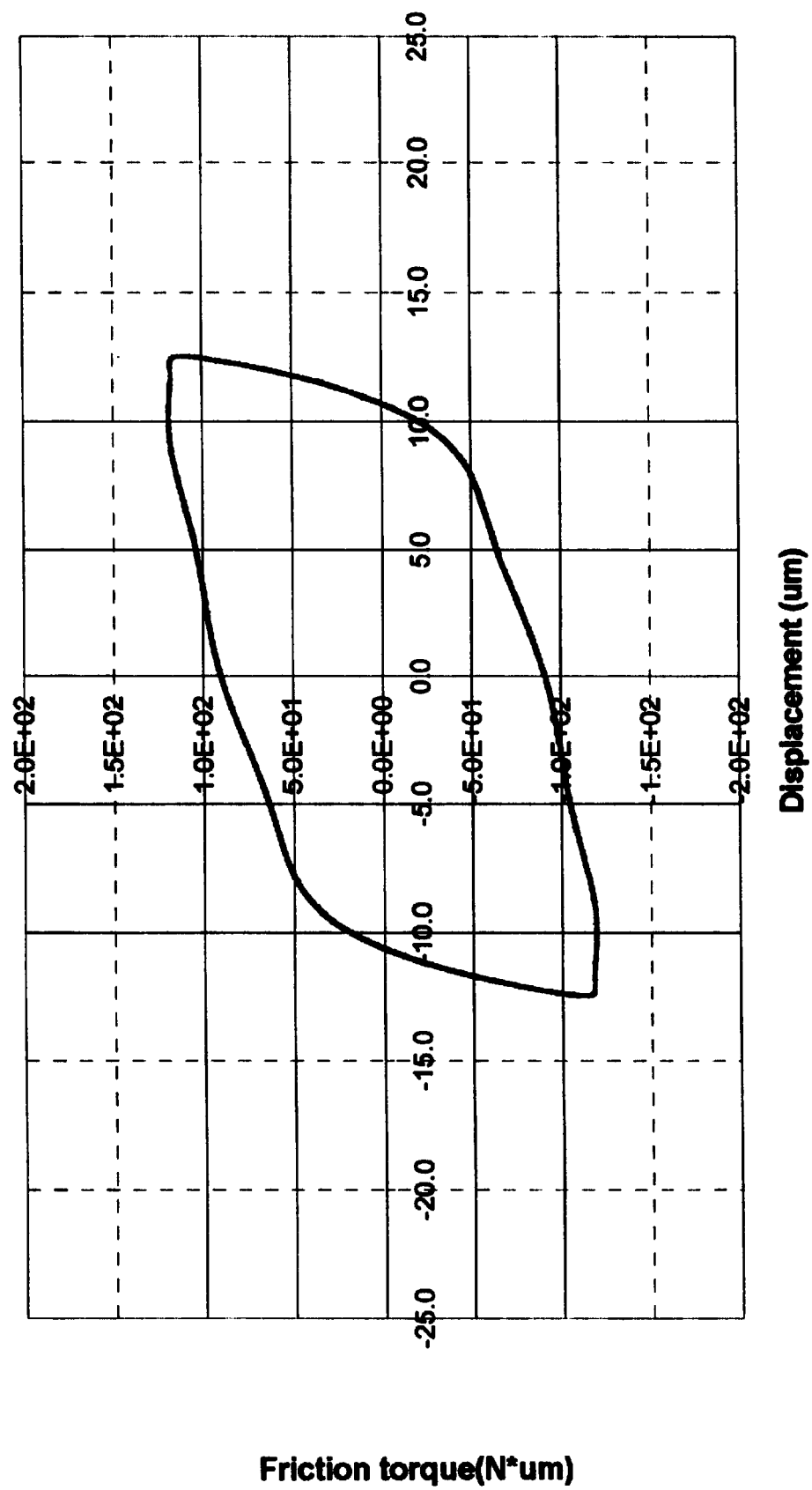
FIG. 20 is a plot of friction torque versus displacement illustrating the hysteresis friction behavior.

FIG. 20 shows the shape of hysteresis friction. When testing the actuator assembly 320, a specific frequency and displacement must be chosen. For example, FIG. 20 describes the hysteresis friction when tested at a frequency of about 5 Hertz and a displacement of about 12 or 13 microns. As these parameters are varied, the shape of the hysteresis plot changes. For servo design, it is important to characterize hysteresis.

Returning to the flow chart of FIG. 5, if position control was not selected, control continues to step 508 where it is determined if velocity control was selected. If so, control passes to step 510, which initializes the velocity using PID control using the velocity feedback signal from the motion sensor 412. Since the velocity feedback signal is used, the microcontroller 418 is configured as shown in FIG. 7. Control then passes to step 512, where a command to move the actuator in a particular direction at a desired velocity is sent by computer 450. At step 514, the signal analyzer 430 collects the actuator velocity feedback signal from the motion sensor 412 and the sense current from the coil driver 616. From here, control is passed to decision step 516, which inquires if velocity control should be stopped. If not, control remains at decision step 516. If velocity control is to be stopped, control passes back to starting point 502 where another test can be implemented.

Figure 9:
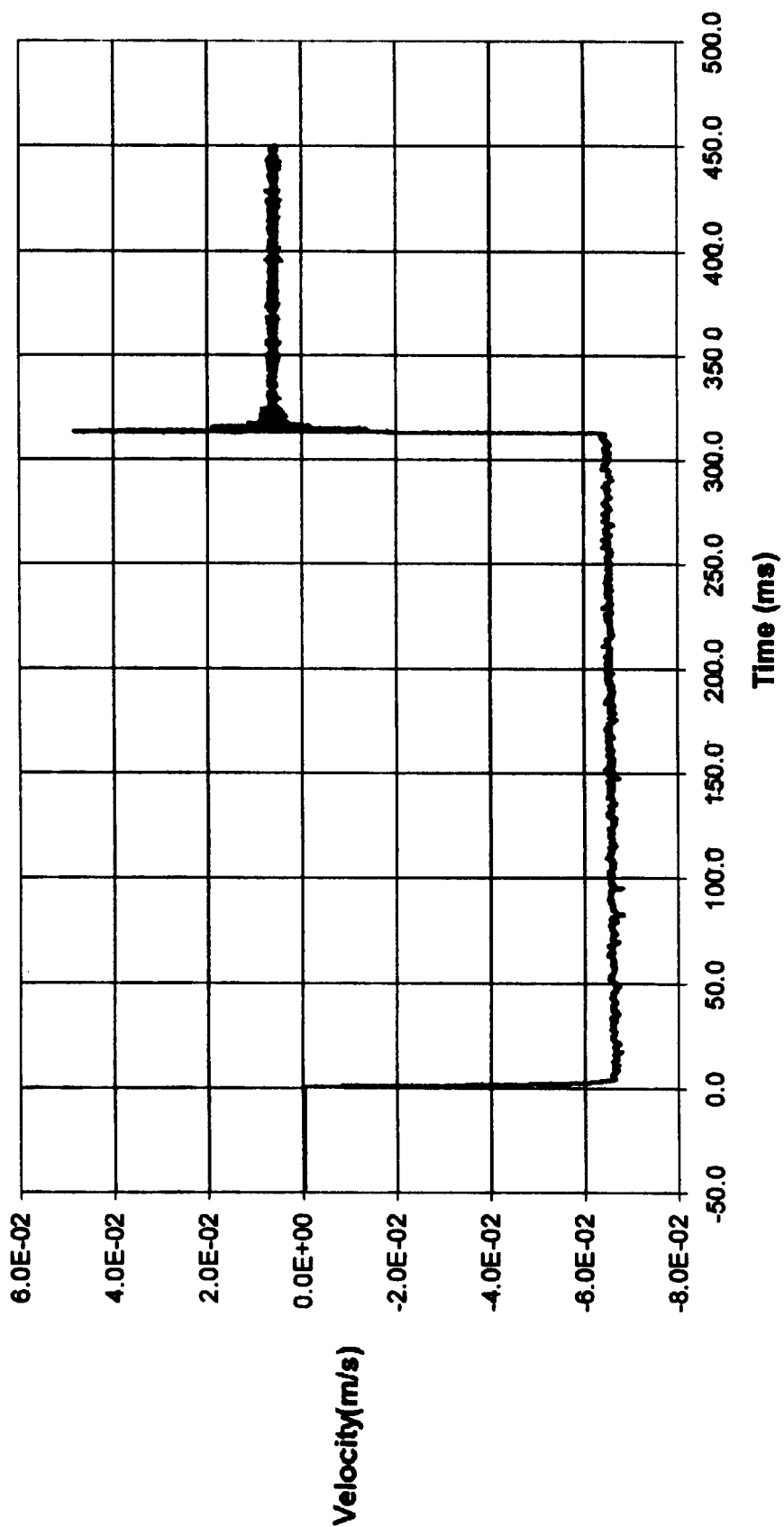
FIG. 9 is a plot of velocity versus time, showing actuator performance running from the inner to the outer diameter at 66 millimeters per second.

With the velocity control test implemented and the information collected by signal analyzer 430, various parameters of the component being tested can be analyzed. For example, the velocity of the actuator assembly can be plotted as shown in FIG. 9. FIGS. 9–13 illustrate the dynamic bias of the actuator which was determined using the velocity control test shown in steps 510, 512, and 514 of FIG. 5 according to the present invention. In hard disc drives (HDD), dynamic bias is the torque needed to maintain the actuator position. To a large degree, bias is composed of the force of the flex cable and the resisting torque of the pivot bearing. This bias information must be considered in the servo design of the HDD. The integrated test system of the preferred embodiment of the present invention provides bias measurements under different angular velocities. The bias is given by equation (4):

$$\text{Bias} = I*K_t - J*\ddot{\Theta} \tag{4}$$

in which:

I=current, and

Θ=angular acceleration.

Figure 10:
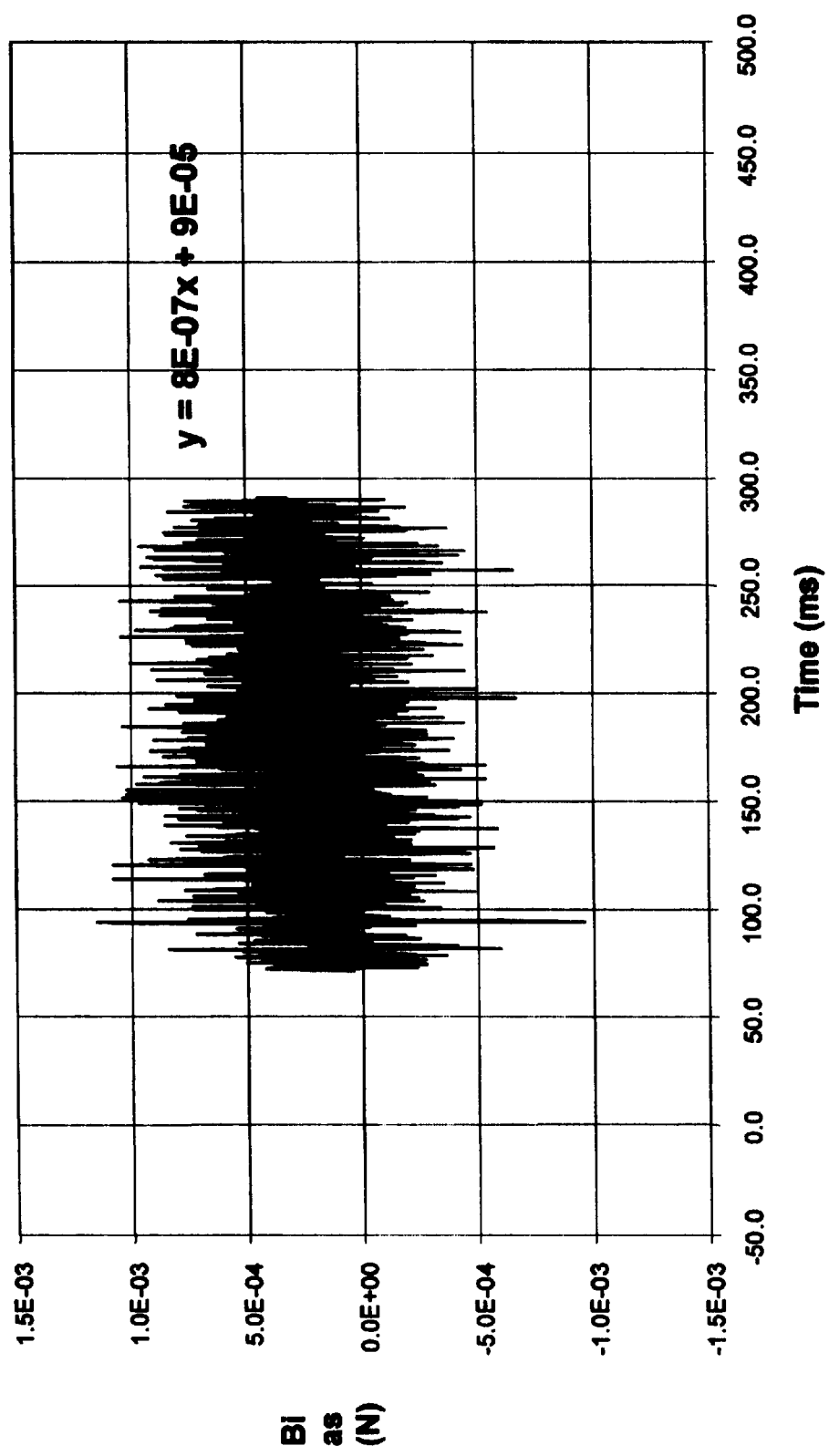
FIG. 10 is a plot of dynamic bias versus time showing dynamic bias at constant velocity of 66 millimeters per second.
Figure 11:
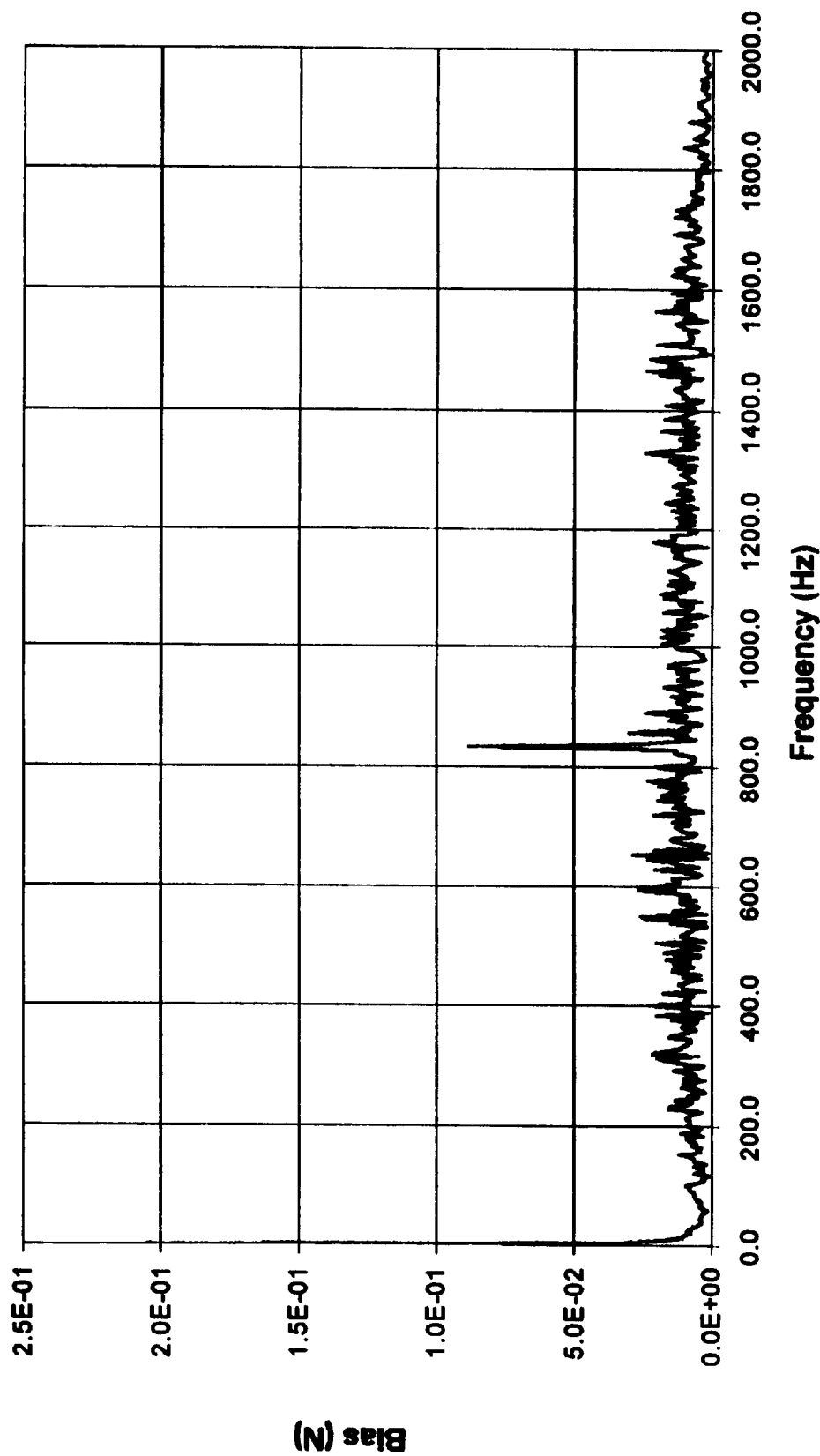
FIG. 11 is a plot of dynamic bias versus frequency taken at a constant velocity of 66 millimeters per second.
Figure 12:
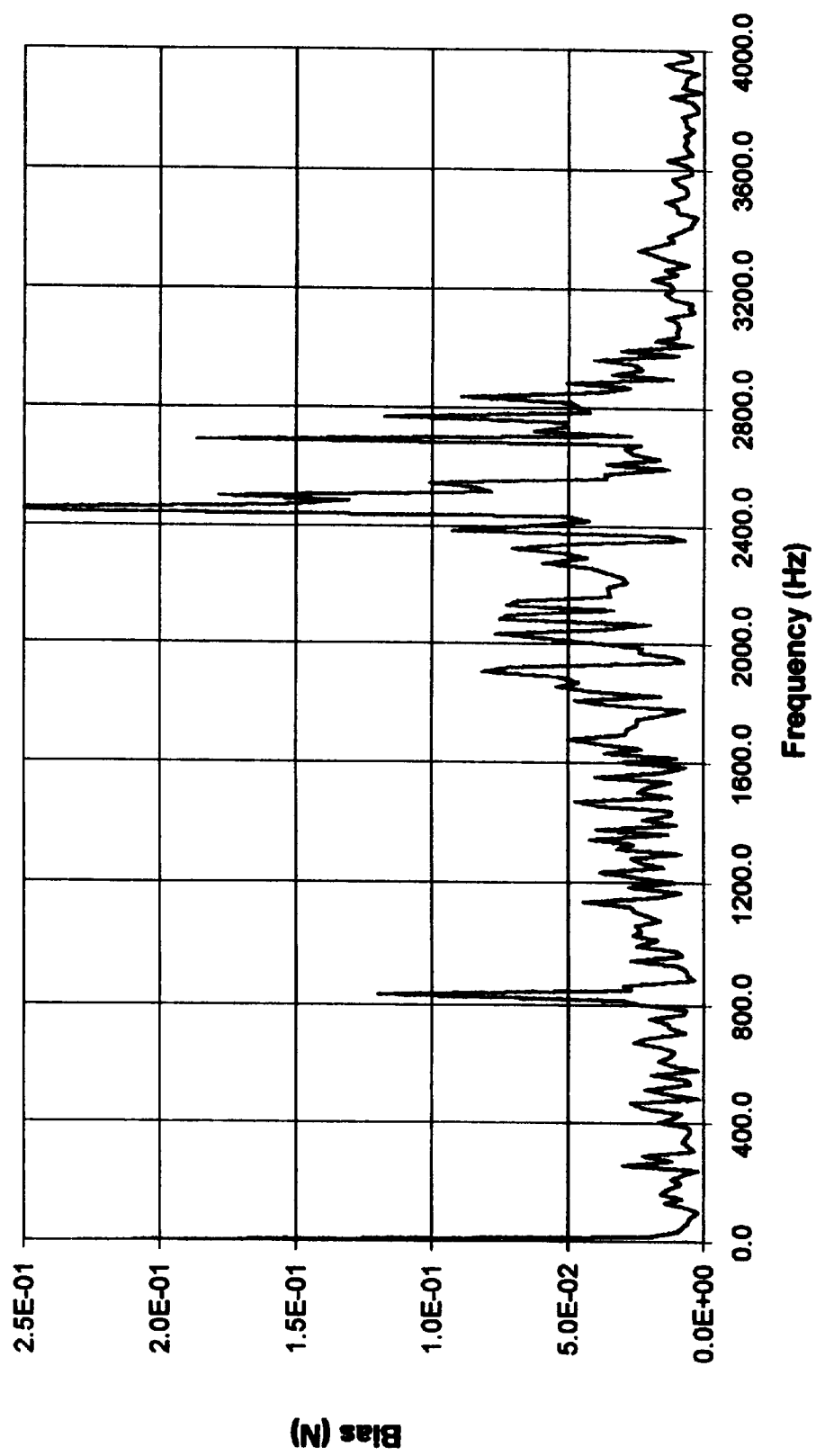
FIG. 12 is a plot of dynamic bias versus frequency taken at a constant velocity of 154 millimeters per second.

FIG. 9 shows the linear velocity of an actuator assembly as it is moved from an inner to an outer diameter at approximately 66 millimeters per second. FIG. 10 is a graph of the corresponding bias while FIG. 11 is a graph of the corresponding spectrum. Note that FIG. 10 demonstrates that the bias is not constant from the inner to the outer diameter. Instead, as evidenced by the trend-line shown on the plot, it has a slight upward slope. This means that the bias increases slightly when the actuator assembly is moved from an inner diameter to an outer diameter. FIG. 10 shows a peak at about 832 Hertz (Hz), which is believed to be caused by the voice coil motor. It should be noted that the voice coil motor 240 can not be excluded, as this component is required to move the actuator arm. It can be separately characterized, however, and then compensated for by the servo designer. Likewise, FIG. 12 is a graph of dynamic bias versus frequency taken at a constant velocity of 154 millimeters per second. In addition to the voice coil motor 240 peak at about 832 Hz, a second peak appears at about 2500 Hz. This is believed to be the natural frequency of the arm. The cause or causes of the other resonances is not known but an advantage of the integrated test system of the present invention is that it can obtain this information which may be later studied.

Figure 13:
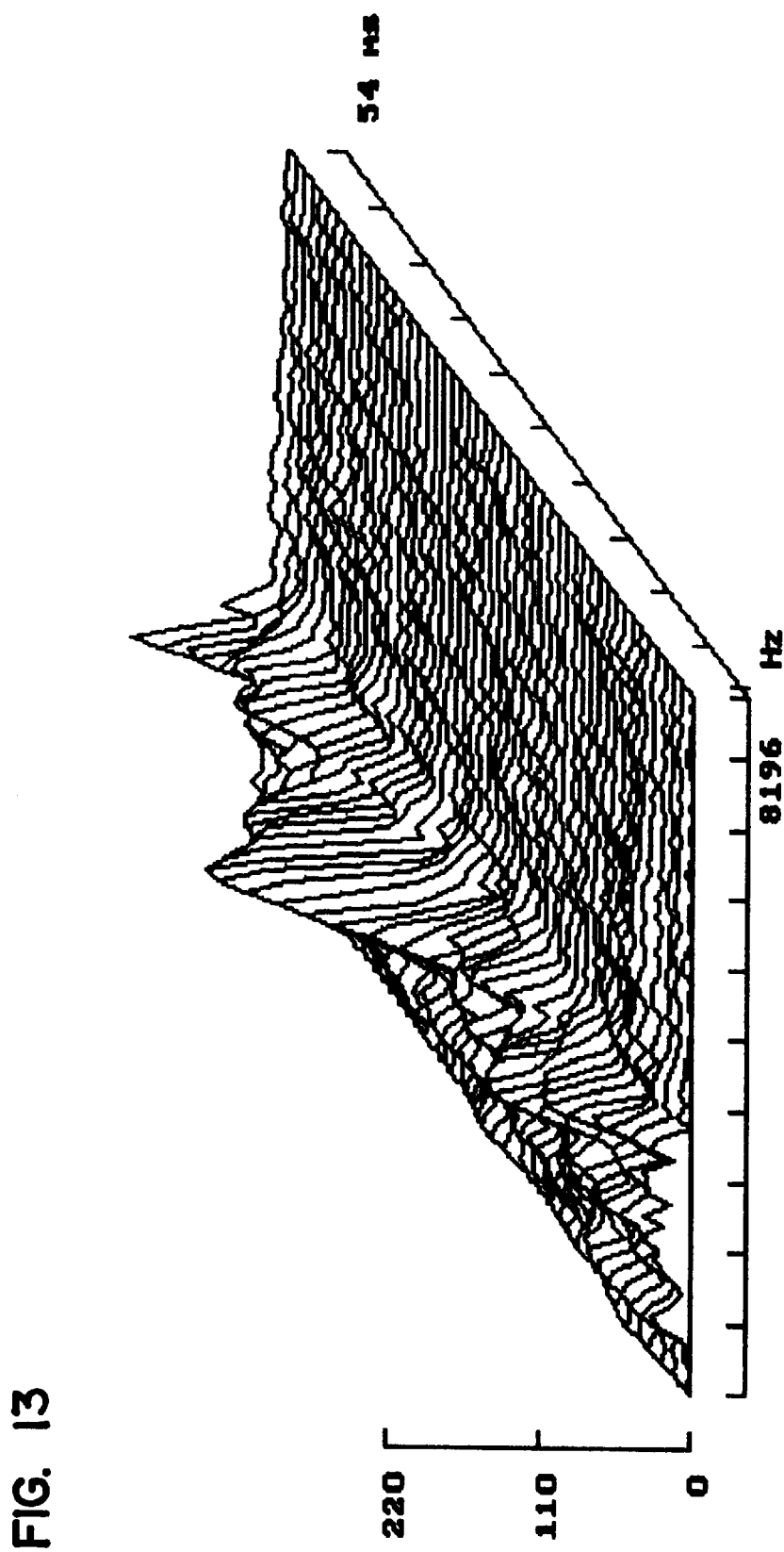
FIG. 13 is a waterfall plot of dynamic bias showing actuator performance running from the inner to the outer diameter at a constant velocity of 154 millimeters per second.

These plots demonstrate that the bias signal at a constant velocity can be used to investigate and analyze mechanical resonance. Finally, FIG. 13 is a waterfall plot of bias signal which shows significant amplitude modulation for resonance components. The vertical axis describes the amplitude of the bias, the horizontal axis describes frequency of operation of the actuator assembly while the third axis represents time. For a particular velocity, time can be translated into position.

Returning to the flowchart of FIG. 5, if it was determined at step 508 that velocity control was not selected, control is passed to decision step 518, where it is determined whether current control was selected. If current control was not selected, control passes back to input box 504. Otherwise, control continues to step 520, and the current to the voice coil motor 240 is set to zero. Then, at step 522, the current to the voice coil motor 240 is increased by an increment of preferably $9 \cdot 10^{-5}$ amps. Control then passes to decision step 524, which determines whether the present current is sufficient to balance the external force, i.e., whether static bias has been overcome. If not, control passes back to step 522 in which the current to the voice coil motor 240 is once again increased by an increment. If, however, the external force has been balanced, control passes to step 526, in which the bias or unlatch force is calculated. Next, control continues to decision step 528, where it is determined whether current control should be stopped.

If so, control passes back to input step 504. If not, control returns to step 522.

The functional requirements of the various components will now be described. While in a preferred embodiment of the invention the motion sensor 412 is a laser Doppler vibrometer, a number of other motion sensors may be used such as an accelerometer which could be mounted on the actuator arm itself. A disadvantage in using an accelerometer is that it adds mass to the actuator arm. While this can be compensated for, it adds complexity to the system. Further, it would be difficult to use an accelerometer to characterize different components of the actuator assembly since the accelerometer would have to be adapted for mounting to different portions of the actuator assembly. Preferably, the motion sensor 412 should have a resolution of at least about 0.01 microns and a bandwidth of at least about 20 kiloHertz. In a more preferred embodiment, the motion sensor 412 has a resolution of at least about 0.008 microns and a bandwidth of at least about 1 megaHertz. A suitable laser Doppler vibrometer is commercially available from Polytec of Germany.

The microcontroller 418 can be a commercially available programmable controller such as Motorola's 68HC05-705 or Texas Instruments' TMS320C3X. In a preferred embodiment, the microcontroller 418 is Intel's 80C196KC, which is a programmable microcontroller typically used for high speed and high performance control applications. In another embodiment, the functions of the microcontroller 418 could be accomplished using additional software in the computer 450. This would require a sampling rate of at least 10 kiloHertz and a 12 bit resolution.

The signal analyzer 430 is preferably a digital signal analyzer The signal analyzer 430 must be able to perform sweep sine analysis, time capture, and Fast Fourier Transform (FFT) frequency-domain analysis. Optionally, an ability to perform waterfall diagrams is also beneficial. FIG. 10, which is a pure mechanical Bode plot, requires sweep sine analysis capability while FIGS. 11 and 12 require time capture ability. Preferably, the signal analyzer 430 is Hewlett-Packard's HP 35670A. While other signal analyzers are available, the HP is preferred. In another embodiment, appropriate computer software could be used to perform the functions of the signal analyzer 430. This software may be available, but would be cumbersome to operate.

Preferably, a personal computer is used as the computer 450. It sends commands to the microcontroller 418 and collects information from the microcontroller 418 and signal analyzer 430. The personal computer 450 also performs additional analysis and data output. The logic implemented by the personal computer is shown in FIG. 5.

According to a first aspect of the invention, there is provided a method of dynamically characterizing a desired component on an actuator assembly 320. The method includes the steps of mounting the actuator assembly 320 on a test platform 1710. The test platform 1710 has a motion sensor 412, a coil driver 416 coupled to the actuator assembly 320, a microcontroller 418 coupled to the motion sensor 412, the coil driver 416, a computer 450 and a signal analyzer 430 coupled to the coil driver 416, the motion sensor 412 and the computer 450. The microcontroller 418 receives displacement and velocity feedback signals from the motion sensor 412 and is programmed to perform PID control based on the feedback signals. The method also includes the step of inputting a command from the computer 450 to conduct a position test on the desired component of the actuator assembly 320. The position test includes supplying a signal to the coil driver 416 to cause movement of the desired component on the actuator assembly 320. The motion sensor 412 is aimed at the desired component on the actuator assembly 320. Displacement feedback from the desired component is sensed with the motion sensor 412. Finally, a current sense signal is collected from the coil driver 416 and displacement feedback is collected from the motion sensor 412 with the signal analyzer 430.

According to a second aspect of the present invention there is provided method of calculating the inertia of a component located on an actuator assembly 320. The method includes the steps of mounting the actuator assembly 320 on a test platform 1710. The test platform 1710 has a motion sensor 412, a coil driver 416 coupled to the actuator assembly 320, a microcontroller 418 coupled to the motion sensor 412, the coil driver 416, a computer 450 and a signal analyzer 430 coupled to the coil driver 416, the motion sensor 412 and the computer 450. The microcontroller 418 receives displacement and velocity feedback signals from the motion sensor 412 and is programmed to perform PID control based on the feedback signals. The method also includes the step of inputting a command from the computer 450 to conduct a position test on the component located on the actuator assembly 320. The position test includes supplying a signal to the coil driver 416 to cause movement of the component on the actuator assembly 320. The motion sensor 412 is aimed at the component located on the actuator assembly 320. Displacement feedback from the component is sensed with the motion sensor 412. A current sense signal also is collected from the coil driver 416 and displacement feedback is collected from the motion sensor 412 with the signal analyzer 430 to cause calculating the moment of inertia of the component. Finally, the moment of inertia of the component is calculated.

According to a third aspect of the invention, there is provided an integrated test system 400 for dynamically characterizing a desired component of an actuator assembly 320. The integrated test system 400 includes a test platform 1710, a motion sensor 412, a coil driver 416, a microcontroller 418, and a signal analyzer 430. The test platform 1710 is suitable for mounting the actuator assembly 320 to be tested. The motion sensor 412 is aimed at the desired component in order to perform the test. The coil driver 416 is mounted on the test platform 1710 and is coupled to the actuator assembly 320. The coil driver 416 instructs the actuator assembly 320 to move. The microcontroller 418 is mounted on the test platform 1710 and is coupled to the coil driver 416. The microcontroller 418 exerts PID control over the actuator assembly 320. The signal analyzer 430 is mounted on the test platform 1710 and is coupled to the motion sensor 412 and the coil driver 416. The signal analyzer 430 collects displacement and velocity feedback signals from the motion sensor 412.

The above specification, examples and data provide a complete description of the manufacture and use of the composition of the invention. Since many embodiments of the invention can be made without departing from the spirit and scope of the invention, the invention resides in the claims hereinafter appended. For example, the particular elements may vary depending on the particular application for the test apparatus while still maintaining substantially the same functionality.

What is claimed is:

1. A method of dynamically characterizing a desired component on an actuator assembly, the method comprising steps of:
   (a) mounting the actuator assembly on a test platform, the test platform having;
      (a)(1) a motion sensor coupled to the actuator assembly;

(a)(2) a coil driver coupled to the actuator assembly;
(a)(3) a microcontroller coupled to the motion sensor;
(a)(4) a computer coupled to the microcontroller, wherein the microcontroller receives displacement and velocity feedback signals from the motion sensor and is programmed to perform PID control based on the feedback signals;

(b) inputting a command from the computer to conduct a position test on the desired component of the actuator assembly wherein the position test includes:
(b)(i) supplying a signal to the coil driver to cause movement of the desired component on the actuator assembly;
(b)(ii) aiming the motion sensor at the desired component on the actuator assembly;
(b)(iii) sensing displacement feedback from the desired component with the motion sensor; and
(b)(iv) collecting a current sense signal from the coil driver and displacement feedback from the motion sensor with the signal analyzer.

2. The method of claim 1 further comprising a step (c) of generating a Bode plot of the mechanical resonance of the desired component on the actuator assembly, displaying the Bode plot on a screen, and copying the Bode plot on a medium.

3. The method of claim 2 wherein the Bode plot generated in step (c) is obtained at a low frequency.

4. The method of claim 1 further comprising a step (c) of sensing a velocity of movement of the actuator assembly with the motion sensor and (d) generating a plot of the velocity sensed in step (c).

5. The method of claim 4 further comprising a step (e) consisting of a step selected from the group consisting of calculating a dynamic bias in the desired component of the actuator assembly, generating a plot of velocity sensed in step (c) versus time, calculating a waterfall plot of the dynamic bias calculated in step (e), and combinations thereof.

6. The method of claim 5 further comprising a step (f) of displaying the dynamic bias calculated in step (e).

7. The method of claim 5 further comprising a step (e) of generating a plot of dynamic bias versus frequency.

8. The method of claim 1 further comprising a step (c) selected from the group consisting of calculating an inertia of the actuator assembly, calculating a frictional torque of the actuator assembly, generating a plot of $K_t/J$ of the actuator assembly and combinations thereof.

9. The method of claim 1 further comprising a step (c) of performing PID control with the microcontroller using the displacement feedback from the motion sensor and the command from the computer.

10. A method according to claim 1 further comprising a step (c) of inputting a command from the computer to conduct a velocity test on the desired component of the actuator assembly, the velocity test including the steps of:
(c)(i) aiming the motion sensor at the desired component on the actuator assembly;
(c)(ii) sensing velocity feedback from the desired component with the motion sensor; and
(c)(iii) collecting the current sensed signal from the coil driver and velocity feedback from the motion sensor with the signal analyzer.

11. A method according to claim 1 further comprising a step (c) of inputting a command from the computer to conduct a current test on the desired component of the actuator assembly, the current test includes the steps of:

(c)(i) setting a current command to the coil driver to zero;
(c)(ii) increasing the current command to the coil driver by an increment;
(c)(iii) detecting whether there is movement of a ball bearing in a pivot bearing assembly;
(c)(iv) if there is no movement detected in step (c)(iii), increasing the current command to the coil driver by an increment and performing step (c)(iii) until movement is detected; and
(c)(v) if movement is detected in step (c)(iii) calculating the bias force.

12. A method of calculating an inertia of a component, the method comprising steps of:
(a) mounting the component on an actuator assembly located a test platform, the test platform having;
(a)(1) a motion sensor;
(a)(2) a coil driver coupled to the actuator assembly;
(a)(3) a microcontroller coupled to the motion sensor;
(a)(4) a computer coupled to the microcontroller, wherein the microcontroller receives displacement and velocity feedback signals from the motion sensor and is programmed to perform PID control based on the feedback signals;

(b) inputting a command from the computer to conduct a position test on the desired component of the actuator assembly wherein the position test includes:
(b)(i) supplying a signal to the coil driver to cause movement of the actuator assembly;
(b)(ii) aiming the motion sensor at the component located on the actuator assembly;
(b)(iii) sensing displacement feedback from the component with the motion sensor;
(b)(iv) collecting a current sense signal from the coil driver and displacement feedback signals from the motion sensor; and (c) calculating the moment of inertia of the component.

13. An integrated test system for dynamically characterizing a desired component of an actuator assembly, the integrated test system comprising:
a test platform suitable for mounting the actuator assembly to be tested;
a motion sensor aimed at the desired component;
a coil driver mounted on the test platform wherein the coil driver is operatively coupled to the actuator assembly to instruct the actuator assembly to move;
a microcontroller mounted on the test platform, wherein the microcontroller is operatively coupled to the coil driver to exert PID control over the actuator assembly; and
a signal analyzer mounted on the test platform, wherein the signal analyzer is operatively coupled to the motion sensor and the coil driver and the signal analyzer collects displacement and velocity feedback signals.

14. The integrated test system of claim 13 wherein the motion sensor is a laser Doppler vibrometer.

15. The integrated test system of claim 13 further comprising a computer coupled to the microcontroller and the signal analyzer wherein the computer instructs the microcontroller to perform a test on a desired component of the actuator.

16. The integrated test system of claim 13 wherein the desired components are selected from a group consisting of a head, a suspension arm, a voice coil motor and a pivot bearing assembly.

17. An integrated test system for dynamically characterizing a desired component of an actuator assembly, the test system comprising:

a test platform for mounting the actuator assembly;

a motion sensor aimed at the desired component on the actuator assembly;

means for operatively instructing the actuator assembly to move, for exerting PID control over the actuator assembly and collect output signal; and collect displacement and velocity feedback signals from the motion sensor.

18. The integrated test system of claim 17 wherein the motion sensor is a laser Doppler vibrometer.

19. The integrated test system of claim 17 wherein the desired components are selected from a group consisting of a head, a suspension arm, a voice coil motor and a pivot bearing assembly.

* * * * *